United States Patent
Wang et al.

(10) Patent No.: US 6,254,260 B1
(45) Date of Patent: Jul. 3, 2001

(54) CAR CABIN LIGHT DEVICE

(75) Inventors: Shaw-Jong Wang, Hsinchu; Chi-Jung Shen, Taipei; Hsin-Hua Chang, Chung Li, all of (TW)

(73) Assignee: Ritek Corporation (TW)

( * ) Notice: Subject to any disclaimer, the term of this patent is extended or adjusted under 35 U.S.C. 154(b) by 0 days.

(21) Appl. No.: 09/399,327

(22) Filed: Sep. 20, 1999

(30) Foreign Application Priority Data

Aug. 7, 1999 (TW) .................................. 88213371

(51) Int. Cl.$^7$ ....................................................... B60Q 1/00
(52) U.S. Cl. ............................ 362/488; 362/84; 313/506
(58) Field of Search ................................... 362/492, 468, 362/84, 86, 253; 313/512, 506

(56) References Cited

U.S. PATENT DOCUMENTS 5,552,009 * 9/1996 Zager et al. ......................... 156/220
6,107,735 * 8/2000 Hora ..................................... 313/506

* cited by examiner

Primary Examiner—Stephen Husar
Assistant Examiner—John Anthony Ward
(74) Attorney, Agent, or Firm—Finnegan, Henderson, Farabow, Garrett & Dunner, L.L.P.

(57) ABSTRACT

A car cabin light device capable of storing digital data is disclosed. The car cabin light device comprises a switch, a light emitting element for emitting light under a biasing of an external source, and a socket provided in a car cabin for detachably receiving the light emitting element and conducting the external source thereto. The light emitting element is constructed by a luminous disk having a first surface for accessing data and a second surface for luminescing. The luminous disk comprises: a data recording lamination located at the side of first surface for storing digital data; a light emitting lamination having two side planes and located at the side of second surface; and a biasing lamination for receiving the external source and applying it to the two side planes of the light emitting lamination for emitting light.

5 Claims, 2 Drawing Sheets

CAR CABIN LIGHT DEVICE

BACKGROUND OF THE INVENTION

1. Field of the Invention

The invention relates to a car cabin light device, more particular to a car cabin light device capable of illumining the car cabin and storing digital data such as a daily maintenance message for the car, speech or audio/video data.

2. Description of the Prior Art

A car cabin light is usually constructed by an incandescent bulb or a fluorescent lamp. However, the lifetime for such a conventional incandescent bulb is at most some one hundred to one thousand hours and thus a replacement of bulb is required frequently. Such a replacement is particular troublesome if the bulb to be replaced is located in a complicated mechanism or a convert place.

Moreover, a car audio system tends toward using optical disk play system. For complying to the use of such an audio system, a space in the car for storing the disk not to be played is necessary. However, such a space is hardly serviceable for other uses in case if no disks are to be stored.

Furthermore, as the world progresses, new styles of management are promoted. Management of car driving data, car maintenance data, or car service data are also demanded. To comply with such a demand, car driving data can be recorded by a car engine management computer and thus could be carried along with the car. However, the maintenance data or the service data is usually recorded in a computer at a car service center and thus could not be carried along with the car and once the service center for the car is changed, such a service data can not be continued to be utilized as reference.

SUMMARY OF THE INVENTION

Therefore, the object of this invention is to provide a car cabin light device capable of storing digital data and lighting the cabin. The digital data can concern car messages or relate to any video or audio data. The light device can be located in any place of the car which needs not to be spotlighted.

To achieve the above object, the car cabin light device according to this invention comprises a switch for turning the light on/off, a light emitting element for emitting light under a bias of an external source, and a socket provided in a car cabin for detachably receiving the light emitting element and conducting the external source thereto. The present invention is characterized in that the light emitting element is constructed by a luminous disk having a first surface for accessing data and a second surface for luminescing, and that the luminous disk comprises:

- a data recording lamination located at the side of first surface for storing digital data;
- a light emitting lamination having two side planes and located at the side of second surface; and
- a biasing lamination for receiving and applying the external source onto the two side planes of the light emitting lamination for emitting light.

By means of the above mentioned design, a longer lifetime of the car cabin light, a more modifiable light shape, as well as a more gentle light will be available. Moreover, since one side of the light emitting element can be used to store/read digital data, the light emitting element could be used as a medium for storing a maintenance or service records or messages when it is taken from the socket. In contrast, the medium for storing data could be received in the socket to serve as a car cabin light when it is not used to store data or to play music, and thus solving the storage space problem of the medium. Furthermore, the maintenance or service records could be continued even though the service center is temperately changed because of the benefit of carrying the storage medium in the car without increased storage space needed.

These and other objects, features and advantages of this invention will be apparent from the following more particular description of the preferred embodiments of this invention as illustrated in the accompanying drawings.

DETAILED DESCRIPTION OF THE INVENTION

Figure 1:
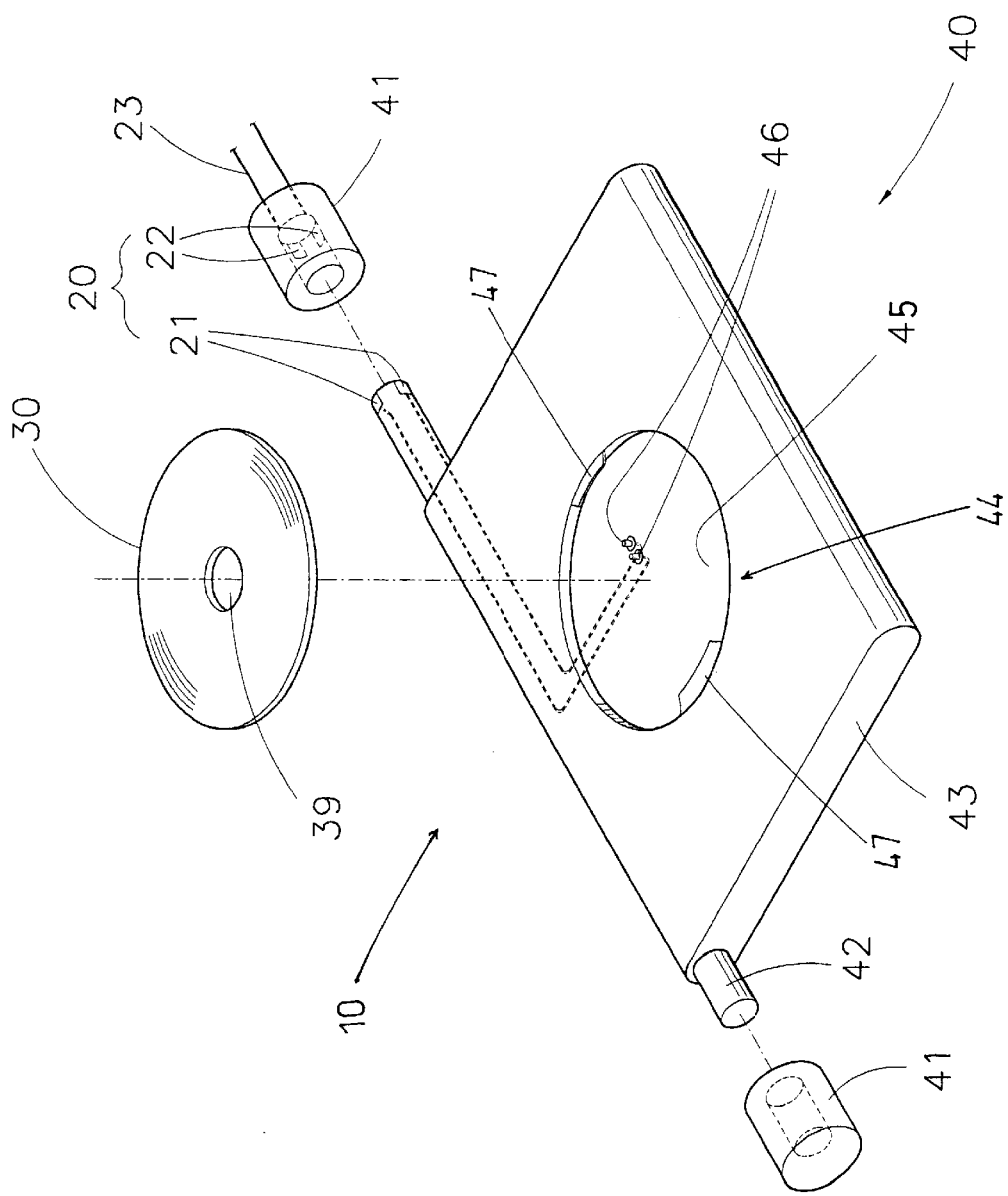
FIG. 1 is an exploded perspective view of a car cabin light device according to one embodiment of this invention.

FIG. 1 is an exploded perspective view showing the structure of one embodiment of a car cabin light device 10 according to this invention. In this embodiment, the car cabin light device 10 is mounted on a car front sunbreaker 40. As shown in FIG. 1, the car cabin light device 10 generally comprises a switch unit 20 for turning the light on/off, a luminous disk 30 serving as a light emitting element for emitting light, and a socket 44 mounted on the sunbreaker 40 for receiving the luminous disk 30.

The sunbreaker 40 generally comprises a shaft seat 41, a rotating rod 42, and a plate body 43 securely mounted on the rotating rod 42. The socket 44 is provided on one side of the sunbreaker 40 such that the luminous disk 30 will light downward when the sunbreaker 40 is in its everted position. The socket 44 comprises a round recess 45 suitable for receiving the luminous disk 30, a pair of lips 47 located in the opposite edges of the recess 45, a flexible biasing means (not shown) for aligning the luminous disk 30 in its correct position, and a pair of contacts 46 protruding from the bottom of recess 45 for conducting an external source to the luminous disk 30. The pair of lips 47 comprises a larger one and a smaller one, and the biasing means is provided between the inner side of the larger one and the bottom of recess 45. Each of the pair of contacts 46 is constructed by a retractable conducting pin. Other any suitable type of conducting pin is also available. The pitch of two contacts 46 is corresponding to the pitch of the pads provided on luminous disk 30 which will be described below, and the set of two contacts 46 is located in a position corresponding to the position of the set of two pads when the luminous disk 30 is received in the socket 44, so as to make each contact and its corresponding pad electrically conduct.

Switch unit 20 comprises a pair of male contacts 21 provided on the circular surface of one end of the rotating rod 42 and a pair of female contacts 22 provided in the inner circular surface of the shaft seat 41. The male contacts 21 are electrically connected to contacts 46 respectively, and the female contacts 22 are electrically connected to an external source via a pair of leads 23. The contacts 21 and 22 are positioned such that a turn-on conducting contact is built when the sunbreaker 40 is set to its everted position and a turn-off staggered condition is formed when the sunbreaker 40 is set to its retractile position.

Figure 2:
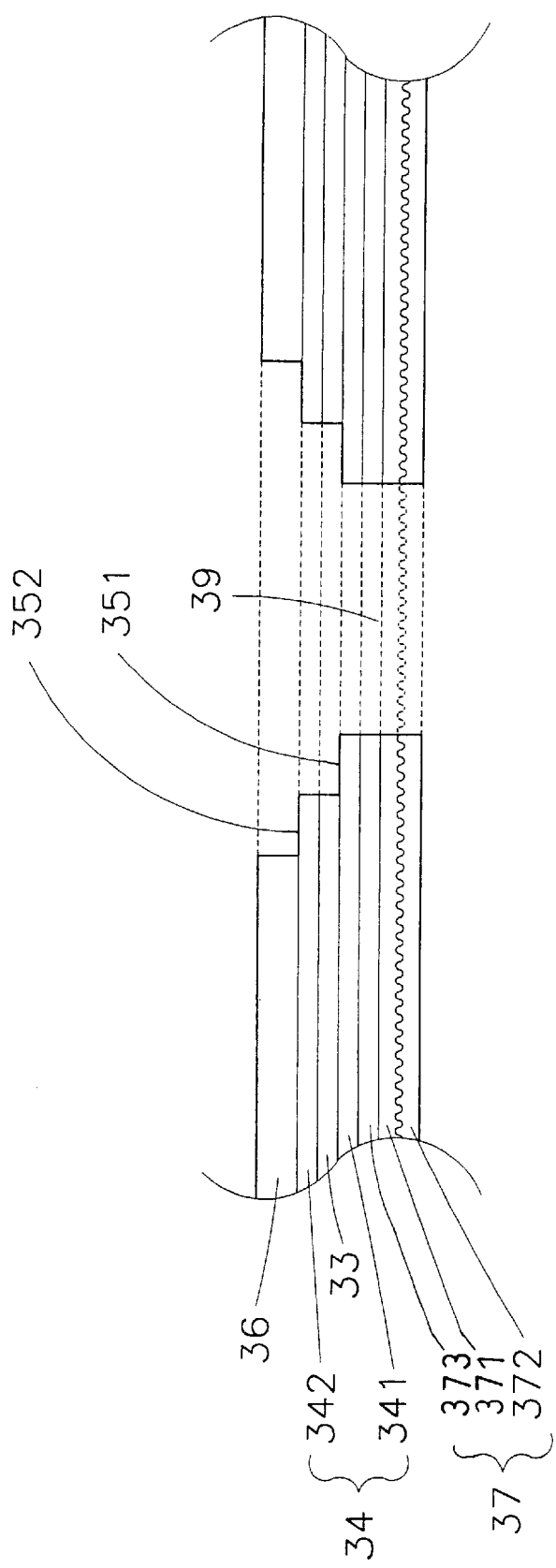
FIG. 2 is an enlarged partial section view of the luminous disk shown in FIG. 1.

The luminous disk 30, as shown in FIG. 2, generally has a first surface for accessing data, a second surface for luminescing, and a hole 39 located in its center, and is constructed by a data recording lamination 37 laminated at the side of first surface, a light emitting lamination 33 laminated at the side of second surface, and a biasing lamination 34 laminated at two sides of the light emitting lamination 33.

The data recording lamination 37 illustrated in FIG. 2 comprises a substrate 371 constructed by plastic material or acrylic material for forming a pattern representative of digital data, a metallic reflecting layer 373 formed by plating, printing, or sputtering for reflecting reading light, and a protecting layer 372 for protecting the lower surface of the luminous disk 30. The metallic reflecting layer 373 is usually constructed by aluminum and is located on the side of the substrate opposite to the first surface of the disk. However, the illustration of the structure in FIG. 2 is only an example of data recording lamination 37, such a lamination could be any other proper configurations like current CD-R, CD-RW, or CD-ROM. Moreover, the data recording lamination 37 can also be constructed by a magnetic recording element, a magnetic-optical recording element, a magnetic-electric recording element, or an electric-optical recording element. These configurations are all currently available and thus their constructing material and methods are omitted herein.

The light emitting lamination 33 is provided on the side of the data recording lamination 37 opposite to the first surface, and is provided with two side planes for receiving the external biasing source. The light emitting lamination 33 can be constructed by any proper electroluminescence material which will luminesce when the two side planes thereof are biased by the external biasing source. The electroluminescence material can be one selected from the group consisting of organic and inorganic luminescence material or one selected from the group consisting of organic molecules and organic polymer luminescence material. Moreover, the light emitting lamination 33 can be formed by any proper method, such as thermal sputtering or printing, in light of the material to be used. In case the light emitting lamination 33 is constructed by inorganic material, a dielectric layer (not shown) should be included, and the external source applied to the light emitting lamination 33 would be an alternating-current source.

Furthermore, the shape of the light emitting lamination 33 could be optionally defined to present a light of the desired shape. And, the light emitting lamination 33 in the luminous disk 30 can be consisted of two or more parts each constructed by different types of electroluminescence material and thus presenting different color. Thus, colorful and modifiable lighting would be available.

The biasing lamination 34 generally comprises an upper transparent electrode layer 342, a lower electrode layer 341, and a pair of pads 351, 352 respectively located on the two electrode layers. The upper transparent electrode layer 342 and the lower electrode layer 341 are formed on the upper and lower side planes of the light emitting lamination 33 respectively for applying the external source received via the two pads 351, 352 onto the two side planes of the light emitting lamination 33. The pad 351 is formed by an exposing surface of the lower electrode layer 341 which is located adjacent to the hole 39 uncovered by its upper layers. The pad 352 is formed by an exposing surface of the upper transparent electrode layer 342 which is located around the pad 351 with a step formed by the light emitting lamination 33.

The lower electrode layer 341 can be constructed by any proper metal such as aluminum and can be formed by any proper method, such as printing or sputtering. The upper transparent electrode layer 342 is constructed by ITO (indium tin oxide) material or IZO (indium tin oxide) material and is accumulated on the upper side plane of the light emitting lamination 33 by sputtering or printing. As the above illustration concerning the light emitting lamination 33, the biasing lamination 34 shown in FIG. 2 is also an example of its probable configurations. In practice, it is possible to utilize the metallic reflecting layer 373 as an lower electrode for supplying the external biasing source onto the lower side plane of the light emitting lamination 33, instead of utilizing the lower electrode layer 341, and thus to omit the lower electrode layer 341. In such a case, the pad 351 would be formed on the upper surface of the metallic reflecting layer 373.

A protecting layer 36 is preferably further provided on the upper surface of the upper transparent electrode layer 342 so as to protect the upper surface of the luminous disk 30. The protecting layer 36 is constructed by any durable and transparent material.

In accordance with the above structure, when the luminous disk 30 is not used for storing messages or being played, it could be received in the socket 44 and make an interconnection with the contacts 46. In such a situation, if the sunbreaker 40 is everted, the switch unit 20 will be turned on and the external source will be applied to the light emitting lamination 33 via the contacts 46, pads 351,352, and the biasing lamination 34. The car cabin light is thus excited and then luminesces. Therefore, a less-occupying, gentle emitting, and average emitting car cabin light is obtained.

On the other hand, if the luminous disk 30 is intended to store data or to be read, it can be taken from the socket 44 and then to be inserted into a processor (not shown) as a car computer or a service computer for accessing data via the portion of data recording lamination 37. Car messages concerning maintenance, service, etc. are thus completely kept. Moreover, if the data recording lamination of the luminous disk 30 is designed to record digital data concerning music etc., it can also be taken from the socket 44 and then inserted into a CD player for playing when it is intended to be played. In either above case, the luminous disk 30 always can be received in the socket 44 to serve as a light with a less space occupying when an access to data is not performed. Thus, a multi-functional car cabin light device is available, capable of serving as a storage medium which is not space-occupying, and capable of recording all car message.

In the above, though an embodiment directed to a car cabin light device mounted on the sunbreaker is illustrated, it would be acknowledged that the car cabin light device according to this invention can be applied to any suitable place in the car. For example, the car cabin light device can be mounted at the inside of a car door as an door-opened alarm light or be mounted at a back window for a third breaking light. The structure of the switch unit 20 is accordingly changed in compliance with the application of the cabin light, such as a snap type or a button type.

However, while various preferred embodiments of this invention have been illustrated and described, it should be understood that variations will be apparent to those skilled in the art. Accordingly, this invention is not to be limited to the specific embodiments illustrated and described, and the true scope and spirit of this invention are to be determined by reference to the following claims.

What is claimed is:

1. A car cabin light device comprising:
   a switch for turning the light on and off;
   a light emitting element comprising a luminous disk for emitting light under a bias from an external source, wherein the luminous disk comprises:
      a data recording lamination located at the side of a first surface of the luminous disk to store digital data,
      a light emitting lamination having two side planes and located at the side of second surface of the luminous disk, and
      a biasing lamination for receiving and applying the external source onto the two side planes of the light emitting lamination for emitting light; and a socket for detachably receiving the light emitting element and connecting to the external source.

2. The car cabin light device as claimed in claim 1, wherein the data recording lamination comprises a substrate having a side plane provided with a pattern representative of encoded digital data, and a metallic reflecting layer laminated at the side of the substrate opposite to the first surface.

3. The car cabin light device as claimed in claim 1, wherein the data recording lamination comprises a substrate made of a material by which a side plane thereof is able to be formed with a pattern representative of encoded digital data under an illumination of a light beam, and a metallic reflecting layer laminated at the side of the substrate opposite to the first surface.

4. The car cabin light device as claimed in claim 1, wherein the biasing lamination comprises a lower electrode layer formed between the light emitting lamination and the data recording lamination, and an upper transparent electrode formed on the side of the light emitting lamination which faces the second surface, the lower electrode layer and the upper transparent electrode layer each has an exposing surface for receiving the external source.

5. The car cabin light device as claimed in claim 1, wherein the light emitting lamination is constructed with electroluminescence material selected from the group consisting of inorganic luminescence material and organic luminescence material.

* * * * *

UNITED STATES PATENT AND TRADEMARK OFFICE
CERTIFICATE OF CORRECTION

PATENT NO. : 6,254,260 B1  
DATED : July 3, 2001  
INVENTOR(S) : Shaw-Jong Wang et al.

Page 1 of 1

It is certified that error appears in the above-identified patent and that said Letters Patent is hereby corrected as shown below:

<u>Title page,</u>  
Item [57], ABSTRACT, line 2 and 9, "comprises" should read -- includes --.

Signed and Sealed this

Twelfth Day of March, 2002

Attest:

JAMES E. ROGAN  
*Attesting Officer*  *Director of the United States Patent and Trademark Office*